United States Patent
Hu et al.

(10) Patent No.: US 11,134,009 B2
(45) Date of Patent: *Sep. 28, 2021

(54) PACKET PROCESSING METHOD AND APPARATUS

(71) Applicant: HUAWEI TECHNOLOGIES CO., LTD., Guangdong (CN)

(72) Inventors: Weihua Hu, Shanghai (CN); Hui Ni, Beijing (CN); Shiyong Tan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/211,718

(22) Filed: Dec. 6, 2018

(65) Prior Publication Data

US 2019/0109784 A1    Apr. 11, 2019

Related U.S. Application Data

(63) Continuation of application No. 15/177,900, filed on Jun. 9, 2016, now Pat. No. 10,178,023, which is a
(Continued)

(51) Int. Cl.
*H04L 12/721* (2013.01)
*H04L 12/24* (2006.01)
(Continued)

(52) U.S. Cl.
CPC ........ *H04L 45/566* (2013.01); *H04L 12/6418* (2013.01); *H04L 41/0806* (2013.01); *H04L 45/38* (2013.01); *H04L 45/64* (2013.01)

(58) Field of Classification Search
CPC ... H04L 45/566; H04L 41/0806; H04L 45/38; H04L 45/64; H04L 12/6418
(Continued)

(56) References Cited

U.S. PATENT DOCUMENTS

2010/0111041 A1    5/2010   Lim et al.
2010/0142400 A1    6/2010   Schultz et al.
(Continued)

FOREIGN PATENT DOCUMENTS

CN    102349268 A    2/2012
CN    102687465 A    9/2012
(Continued)

OTHER PUBLICATIONS

"OpenFlow Switch Specification" Version 1.3.3 (Protocol version 0x04) XP055176059, dated Sep. 27, 2013, 164 pp.
(Continued)

*Primary Examiner* — Faisal Choudhury
(74) *Attorney, Agent, or Firm* — Levdig, Voit & Mayer, Ltd.

(57) ABSTRACT

The present invention provides a packet processing method and an apparatus. The method includes: determining a to-be-installed flow entry and packet sending information; and sending, to a switch, a flow entry installation message carrying the to-be-installed flow entry and the packet sending information, so that the switch obtains the to-be-installed flow entry and the packet sending information from the flow entry installation message, installs the flow entry, and sends a packet according to the packet sending information. In the present invention, a controller sends a flow entry installation message carrying a to-be-installed flow entry and a packet sending message, where the to-be-installed flow entry and a to-be-sent packet are simultaneously sent, so that a switch simultaneously receives the to-be-installed flow entry and the to-be-sent packet, and performs flow entry installation and packet sending, thereby reducing unnecessary signaling exchange, and improving efficiency of flow entry installation and packet sending.

16 Claims, 6 Drawing Sheets

Related U.S. Application Data continuation of application No. PCT/CN2013/089111, filed on Dec. 11, 2013.

(51) Int. Cl.
*H04L 12/64* (2006.01)
*H04L 12/715* (2013.01)

(58) Field of Classification Search
USPC .......................................................... 370/389
See application file for complete search history.

(56) References Cited

U.S. PATENT DOCUMENTS

| | | |
|---|---|---|
| 2011/0261825 A1 | 10/2011 | Ichino |
| 2013/0010600 A1 | 1/2013 | Jocha et al. |
| 2013/0054761 A1 | 2/2013 | Kempf et al. |
| 2013/0058308 A1* | 3/2013 | Jaiswal ............... H04L 47/34 370/331 |
| 2013/0114615 A1 | 5/2013 | Suemitsu et al. |
| 2013/0170435 A1* | 7/2013 | Dinan ............... H04W 40/02 370/328 |
| 2014/0057634 A1* | 2/2014 | Chang ............... H04W 36/32 455/437 |
| 2014/0247714 A1 | 9/2014 | Sonoda et al. |
| 2014/0348171 A1 | 11/2014 | Akiyoshi |
| 2014/0362705 A1 | 12/2014 | Pan |
| 2015/0009830 A1* | 1/2015 | Bisht ............... H04L 45/745 370/236 |
| 2015/0038145 A1* | 2/2015 | Nakata ............... H04W 36/0055 455/436 |
| 2015/0103665 A1 | 4/2015 | Kaippallimalil et al. |
| 2015/0146736 A1* | 5/2015 | Kawai ............... H04L 41/0886 370/400 |
| 2015/0295833 A1 | 10/2015 | Mizukoshi et al. |
| 2015/0296426 A1* | 10/2015 | Mildh ............... H04W 36/0085 455/436 |
| 2015/0350156 A1 | 12/2015 | Ma et al. |
| 2016/0142264 A1 | 5/2016 | Sahi et al. |
| 2016/0157274 A1* | 6/2016 | Akiyoshi ............... H04W 76/12 370/254 |
| 2016/0255539 A1 | 9/2016 | Mizukoshi et al. |
| 2016/0261464 A1* | 9/2016 | Kusumoto ............ H04L 45/245 |

FOREIGN PATENT DOCUMENTS

| | | |
|---|---|---|
| CN | 102859952 A | 1/2013 |
| CN | 103067534 A | 4/2013 |
| CN | 103401784 A | 11/2013 |
| JP | 2010537488 A | 12/2010 |
| JP | 2013115733 A | 6/2013 |
| JP | 2013118699 A | 6/2013 |
| WO | 2010103909 A1 | 9/2010 |
| WO | 2013153854 A1 | 10/2013 |
| WO | 2013172391 A1 | 11/2013 |

OTHER PUBLICATIONS

Sun, Xiaoye et al., "Attendre: Mitigating Ill effects of Race Conditions in OpenFlow via Queueing Mechanism", Oct. 30, 2012, ACM/IEEE Symposium on Architectures for Networking and Communications Systems (ANCS) XP05513867, (2 pages).
3GPP TS 29.281 V11.6.0 (Mar. 2013), 3rd Generation Partnership Project; Technical Specification Group Core Network and Terminals; General Packet Radio System (GPRS) Tunnelling Protocol User Plane (GTPv1-U) (Release 11), total 27 pages.
Japanese Office Action dated Dec. 26, 2017 in corresponding Japanese Patent Application No. 2016-538673 (3 pages).
Extended European Search Report dated Nov. 7, 2016 in corresponding European Patent Application No. 13899005.6 (9 pages).
International Search Report dated Sep. 15, 2014 in corresponding International Application No. PCT/CN2013/089111 (4 pages).
Gurusanthosh, et al., "SDMA: A Semi-Distributed Mobility Anchoring in LTE Networks," 2013 International Conference on Selected Topics in Mobile and Wireless Networking (MoWNeT), XP032490864, pp. 133-139, Institute of Electrical and Electronics Engineers, New York, New York (Aug. 2013).
CN/201810395858, Search Report, dated Aug. 5, 2020.
U.S. Appl. No. 15/177,900, filed Jun. 9, 2016.
U.S. Appl. No. 16/421,883, filed May 24, 2019.

* cited by examiner

PACKET PROCESSING METHOD AND APPARATUS

CROSS-REFERENCE TO RELATED APPLICATIONS

This application is a continuation of U.S. application Ser. No. 15/177,900, filed on Jun. 9, 2016, which is a continuation of International Application No. PCT/CN2013/089111, filed on Dec. 11, 2013, which applications are hereby incorporated by reference in their entireties.

TECHNICAL FIELD

The present invention relates to network communications technologies, and in particular, to a packet processing method and an apparatus.

BACKGROUND

There are many complex network devices in a telecommunication network, such as a router, a gateway, a switch, a firewall, and various servers. These network devices each support various network protocols to implement interworking between network elements. In these network devices, each device is a network element and includes a packet forwarding module and a control module for various protocols.

Such distributed deployment of the control module in the network element makes deployment and management of the network highly complex, and to modify or upgrade a control parameter, a network operator needs to perform an operation on each device separately.

To resolve a problem with deployment flexibility and manageability of the network element, a concept of software-defined networking (Software-Defined Network, SDN) is proposed in the industry.

In the SDN, control logic and a forwarding function of the network element are decoupled, and the control logic is centrally deployed, so that work of control and maintenance of the network can be implemented simply by operating a control plane device, thereby improving network management efficiency, simplifying a forwarding plane device, and helping achieve high performance and reusability of a forwarding device.

Currently, the SDN idea is being widely applied in a data center network and a telecommunication network. In an SDN network, the most typical and most frequently used protocol is the OpenFlow (Openflow) protocol.

A network element in the Openflow protocol includes an OpenFlow controller (openflow controller, OF Controller for short) and an OpenFlow switch (openflow switch, OF Switch for short).

The OF Controller is responsible for determining a forwarding action, for example, forwarding, discarding, packet header modification, encapsulation, or decapsulation, for the service flow according to packet features such as an IP (Internet Protocol, IP for short) 5-tuple, an Ethernet frame header, and a VLAN ID (Virtual Local Area Network IDentifier, VLAN ID for short), and delivering a corresponding flow entry to the OF Switch. The flow entry includes flow matching information such as an IP 5-tuple and an Ethernet frame header, and a corresponding executed action.

The OF Switch acquires and stores the flow entry, and executes a corresponding action on a subsequent packet conforming to the flow matching information.

When the OF Controller requires the OF Switch to send a packet to an external network element, the OF Controller sends a to-be-sent packet and a corresponding executed action to the OF Switch by using a packet sending message (Packet_Out).

Because the OF Controller uses an independent flow entry installation message Flow_mod and packet sending message Packet_Out, a relatively large quantity of messages are exchanged between the OF Controller and the OF Switch. Therefore, if a process is frequently executed, for example, handover is simultaneously performed for a large quantity of users, a great deal of signaling load is caused to control interfaces, and control interfaces in an entire system are in an overloaded state.

SUMMARY

In view of this, embodiments of the present invention provide a packet processing method and apparatus, so that a switch can simultaneously complete installing a flow entry and sending out a to-be-sent packet according to a flow entry installation message of a controller, thereby reducing unnecessary control message exchange, and improving efficiency of flow entry installation and packet sending.

According to a first aspect, an embodiment of the present invention provides a packet processing method, including:

determining a to-be-installed flow entry and packet sending information; and sending, to a switch, a flow entry installation message carrying the to-be-installed flow entry and the packet sending information, so that the switch obtains the to-be-installed flow entry and the packet sending information from the flow entry installation message, installs the flow entry, and sends a packet according to the packet sending information.

In a first possible implementation manner of the first aspect, the determining a to-be-installed flow entry and packet sending information includes:

determining the to-be-installed flow entry and the packet sending information according to local configuration; or determining the to-be-installed flow entry and the packet sending information by receiving a trigger message of a network element.

With reference to the first aspect or the first possible implementation manner of the first aspect, in a second possible implementation manner of the first aspect, the packet sending information includes a to-be-sent packet or packet construction information used to construct a to-be-sent packet.

With reference to the second possible implementation manner of the first aspect, in a third possible implementation manner of the first aspect, the packet construction information includes at least one piece of information in the following:

a source MAC (Media Access Control) address, a destination MAC address, a source IP address, a destination IP address, a source port number, a destination port number, a packet sequence number, a message type, a GTP (GPRS Tunneling Protocol) TEID (Tunnel Endpoint IDentifier), and a GRE (Generic Routing Encapsulation) Key.

With reference to the second or the third possible implementation manner of the first aspect, in a fourth possible implementation manner of the first aspect, the packet sending information further includes at least one piece of information in the following:

a quantity of packet sending times, a sending processing action, a sending port, sending frequency, sending duration, maximum sending duration, and a maximum quantity of sending times.

With reference to the first aspect or any one of the first to the fourth possible implementation manners of the first aspect, in a fifth possible implementation manner of the first aspect, after the sending, to a switch, a flow entry installation message carrying the to-be-installed flow entry and the packet sending information, the method further includes:

receiving a packet sending result returned by the switch, where the packet sending result includes at least one piece of information in the following:

a quantity of packet sending times, a quantity of times of successful packet sending, a packet response message, and a quantity of times of packet response.

According to a second aspect, an embodiment of the present invention provides a packet processing method, including:

receiving a flow entry installation message that is sent by a controller and that carries a to-be-installed flow entry and packet sending information;

obtaining the to-be-installed flow entry and the packet sending information from the flow entry installation message; and installing the flow entry, and sending a packet according to the packet sending information.

In a first possible implementation manner of the second aspect, the packet sending information includes a to-be-sent packet; and correspondingly, the sending a packet according to the packet sending information includes:

acquiring the to-be-sent packet from the packet sending information and sending the packet;

or the packet sending information includes packet construction information used to construct a to-be-sent packet; and correspondingly, the sending a packet according to the packet sending information includes:

acquiring the packet construction information from the packet sending information; and constructing the to-be-sent packet according to the packet construction information, and sending the packet.

With reference to the first possible implementation manner of the second aspect, in a second possible implementation manner of the second aspect, the packet construction information includes at least one piece of information in the following:

a source MAC address, a destination MAC address, a source IP address, a destination IP address, a source port number, a destination port number, a packet sequence number, a message type, a GTP TEID, and a GRE Key.

With reference to the first or the second possible implementation manner of the second aspect, in a third possible implementation manner of the second aspect, the packet sending information further includes at least one piece of information in the following:

a quantity of packet sending times, a sending processing action, a sending port, sending frequency, sending duration, maximum sending duration, and a maximum quantity of sending times; and the sending a packet according to the packet sending information includes:

sending a packet according to the at least one piece of information.

With reference to the second aspect or any one of the first to the third possible implementation manners of the second aspect, in a fourth possible implementation manner of the second aspect, the method further includes:

receiving a packet response message returned by a packet receiving device; and sending a packet sending result to the controller, where the packet sending result includes at least one piece of information in the following:

a quantity of packet sending times, a quantity of times of successful packet sending, a quantity of times of packet response, and the packet response message.

With reference to the fourth possible implementation manner of the second aspect, in a fifth possible implementation manner of the second aspect, after the receiving a packet response message returned by a packet receiving device, the method further includes: stopping sending a packet according to the packet sending information.

According to a third aspect, an embodiment of the present invention provides a controller, including:

a determining module, configured to determine a to-be-installed flow entry and packet sending information; and a first sending module, configured to send, to a switch, a flow entry installation message carrying the to-be-installed flow entry and the packet sending information, so that the switch obtains the to-be-installed flow entry and the packet sending information from the flow entry installation message, installs the flow entry, and sends a packet according to the packet sending information.

In a first possible implementation manner of the third aspect, the determining module is configured to:

determine the to-be-installed flow entry and the packet sending information according to local configuration; or determine the to-be-installed flow entry and the packet sending information by receiving a trigger message of a network element.

With reference to the third aspect or the first possible implementation manner of the third aspect, in a second possible implementation manner of the third aspect, the packet sending information includes a to-be-sent packet or packet construction information used to construct a to-be-sent packet.

With reference to the second possible implementation manner of the third aspect, in a third possible implementation manner of the third aspect, the packet construction information includes at least one piece of information in the following:

a source MAC address, a destination MAC address, a source IP address, a destination IP address, a source port number, a destination port number, a packet sequence number, a message type, a GTP TEID, and a GRE Key.

With reference to the second or the third possible implementation manner of the third aspect, in a fourth possible implementation manner of the third aspect, the packet sending information further includes at least one piece of information in the following:

a quantity of packet sending times, a sending processing action, a sending port, sending frequency, sending duration, maximum sending duration, and a maximum quantity of sending times.

With reference to the third aspect or any one of the first to the fourth possible implementation manners of the third aspect, in a fifth possible implementation manner of the third aspect, the controller further includes: a first receiving module, configured to: after the first sending module sends the flow entry installation message carrying the to-be-installed flow entry and the packet sending information to the switch, receive a packet sending result returned by the switch, where the packet sending result includes at least one piece of information in the following:

a quantity of packet sending times, a quantity of times of successful packet sending, a packet response message, and a quantity of times of packet response.

According to a fourth aspect, an embodiment of the present invention provides a switch, including:

a second receiving module, configured to receive a flow entry installation message that is sent by a controller and that carries a to-be-installed flow entry and packet sending information; and a second sending module, configured to: obtain the to-be-installed flow entry and the packet sending information from the flow entry installation message; and install the flow entry, and send a packet according to the packet sending information.

In a first possible implementation manner of the fourth aspect, the packet sending information includes a to-be-sent packet; and correspondingly, the second sending module is configured to:

acquire the to-be-sent packet from the packet sending information, and send the packet; or the packet sending information includes packet construction information used to construct a to-be-sent packet; and correspondingly, the second sending module is configured to:

acquire the packet construction information from the packet sending information; and construct the to-be-sent packet according to the packet construction information, and send the packet.

With reference to the first possible implementation manner of the fourth aspect, in a second possible implementation manner of the fourth aspect, the packet construction information includes at least one piece of information in the following:

a source MAC address, a destination MAC address, a source IP address, a destination IP address, a source port number, a destination port number, a packet sequence number, a message type, a GTP TEID, and a GRE Key.

With reference to the first or the second possible implementation manner of the second aspect, in a third possible implementation manner of the second aspect, the packet sending information further includes at least one piece of information in the following:

a quantity of packet sending times, a sending processing action, a sending port, sending frequency, sending duration, maximum sending duration, and a maximum quantity of sending times; and the second sending module is configured to:

send a packet according to the at least one piece of information.

With reference to the fourth aspect or any one of the first to the third possible implementation manners of the fourth aspect, in a fourth possible implementation manner of the fourth aspect, the second sending module is further configured to:

receive a packet response message returned by a packet receiving device; and send a packet sending result to the controller, where the packet sending result includes at least one piece of information in the following:

a quantity of packet sending times, a quantity of times of successful packet sending, a quantity of times of packet response, and the packet response message.

With reference to the fourth possible implementation manner of the fourth aspect, in a fifth possible implementation manner of the fourth aspect, after receiving the packet response message returned by the packet receiving device, the second sending module is further configured to stop sending a packet according to the packet sending information.

According to a fifth aspect, an embodiment of the present invention provides a controller, including: a first processor and a first memory connected to the first controller, where the first memory stores a set of program code, and the first processor is configured to invoke the program code stored in the first memory, to execute the packet processing method described in the first aspect or any one of the first to the fifth possible implementation manners of the first aspect.

According to a sixth aspect, an embodiment of the present invention provides a switch, including: a second processor and a second memory connected to the second processor, where the second memory stores a set of program code, and the second memory is configured to invoke the program code stored in the second memory, to execute the packet processing method described in the second aspect or any one of the first to the fifth possible implementation manners of the second aspect.

According to a seventh aspect, an embodiment of the present invention provides a network device, including the controller described in the fifth aspect and the switch described in the sixth aspect.

According to an eighth aspect, an embodiment of the present invention provides a computer program product, including a computer readable medium, where the readable medium includes a set of program code, used to execute the packet processing method described in the first aspect or any one of the first to the fifth possible implementation manners of the first aspect, and used to execute the packet processing method described in the second aspect or any one of the first to the fifth possible implementation manner of the second aspect.

According to the foregoing solutions, in the embodiments of the present invention, a controller sends a flow entry installation message carrying a to-be-installed flow entry and a packet sending message, and the to-be-installed flow entry and a to-be-sent packet are simultaneously sent, so that a switch simultaneously receives the to-be-installed flow entry and the to-be-sent packet, and performs flow entry installation and packet sending, thereby reducing unnecessary signaling exchange, and improving efficiency of flow entry installation and packet sending.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the present invention clearer, the following further describes the present invention in detail with reference to the accompanying drawings. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
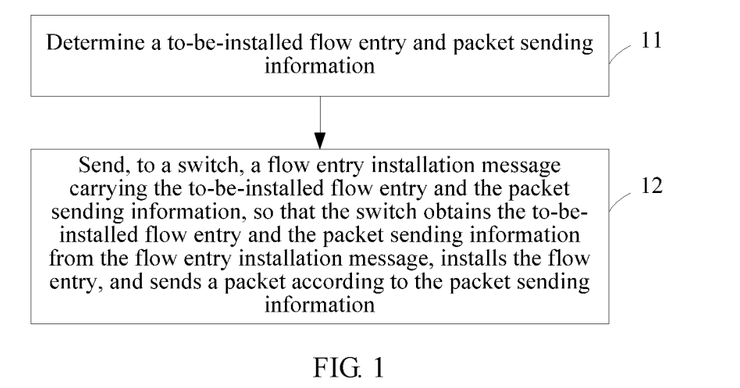
FIG. 1 is a flowchart of a packet processing method according to an embodiment of the present invention.

FIG. 1 is a flowchart of a packet processing method according to an embodiment of the present invention. As shown in FIG. 1, the method includes the following steps:

Step 11: Determine a to-be-installed flow entry and packet sending information.

Step 12: Send, to a switch, a flow entry installation message carrying the to-be-installed flow entry and the packet sending information, so that the switch obtains the to-be-installed flow entry and the packet sending information from the flow entry installation message, installs the flow entry, and sends a packet according to the packet sending information.

Further, the determining a to-be-installed flow entry and packet sending information in step 11 includes:

determining the to-be-installed flow entry and the packet sending information according to local configuration; or determining the to-be-installed flow entry and the packet sending information by receiving a trigger message of a network element.

Further, the packet sending information includes a to-be-sent packet or packet construction information used to construct a to-be-sent packet. The packet construction information includes at least one piece of information in the following:

a source MAC address, a destination MAC address, a source IP address, a destination IP address, a source port number, a destination port number, a packet sequence number, a message type, a GTP TEID, and a GRE Key.

Further, the packet sending information further includes at least one piece of information in the following:

a quantity of packet sending times, a sending processing action, a sending port, sending frequency, sending duration, maximum sending duration, and a maximum quantity of sending times. The information is packet sending action related information, and is used by the switch to send a packet according to these packet sending actions.

Optionally, after the sending, to a switch, a flow entry installation message carrying the to-be-installed flow entry and the packet sending information in step 12, the method further includes:

receiving a packet sending result returned by the switch, where the packet sending result includes at least one piece of information in the following: a quantity of packet sending times, a quantity of times of successful packet sending, a packet response message, and a quantity of times of packet response. The packet sending result may further include: a sent packet, packet sending duration, a response message packet returned by a packet receiving device, and the like. Details are not described herein again.

Specifically, the to-be-installed flow entry and the packet sending message are determined based on a change of a local configuration policy or a trigger of a network element, where the packet sending message includes the to-be-sent message or the packet construction information used to construct the to-be-sent message, and can specify, by using a packet sending action included in the packet sending message, how to send the to-be-sent packet. The to-be-installed flow entry and the packet sending message are simultaneously sent by using the flow entry installation packet, so that after receiving the flow entry installation packet, the switch extracts the to-be-installed flow entry for installation, extracts the to-be-sent packet or extracts the packet construction information and constructs the to-be-sent packet according to the packet construction information, and then sends the to-be-sent packet according to the packet sending action. If packet sending information does not include the packet sending action, the packet is directly sent according to an existing protocol or in a default manner of an application scenario. After the flow entry installation message is sent, a packet sending result returned by the switch may be received, and the local configuration policy may be further adjusted according to the packet sending result, or the network element may be notified of the packet sending result. However, in the prior art, the flow entry installation message and the packet sending message are generally sent separately.

It should be noted that the to-be-installed flow entry is used by the switch to perform matching for a user packet and then process the user packet according to an action included in the flow entry; and the to-be-sent packet included in the packet sending information refers to a packet to be sent by a controller, and the switch sends the to-be-sent packet according to packet sending action information included in the packet sending information. Details are not described herein again.

In this embodiment, by sending a flow entry installation message carrying a to-be-installed flow entry and a packet sending message, the to-be-installed flow entry and a to-be-sent packet are simultaneously sent, thereby reducing unnecessary signaling exchange, and improving efficiency of flow entry installation and packet sending.

Figure 2:
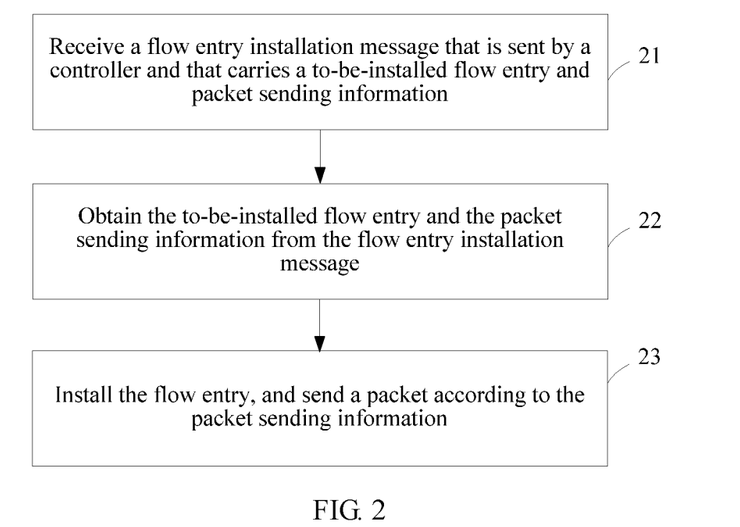
FIG. 2 is a flowchart of a packet processing method according to another embodiment of the present invention.

FIG. 2 is a flowchart of a packet processing method according to another embodiment of the present invention. As shown in FIG. 2, the method includes the following steps:

Step 21: Receive a flow entry installation message that is sent by a controller and that carries a to-be-installed flow entry and packet sending information.

Step 22: Obtain the to-be-installed flow entry and the packet sending information from the flow entry installation message.

The packet sending information includes a to-be-sent packet or packet construction information used to construct a to-be-sent packet.

Step 23: Install the flow entry, and send a packet according to the packet sending information.

Corresponding to step 22, the to-be-sent packet is acquired from the packet sending information, and the packet is sent; or the packet construction information is obtained from the packet sending information, the to-be-sent packet is constructed according to the packet construction information, and the packet is sent.

Further, the packet construction information in step 22 includes at least one piece of information in the following:

a source MAC address, a destination MAC address, a source IP address, a destination IP address, a source port number, a destination port number, a packet sequence number, a message type, a GTP TEID, and a GRE Key.

Further, the packet sending information further includes at least one piece of information in the following:

a quantity of packet sending times, a sending processing action, a sending port, sending frequency, sending duration, maximum sending duration, and a maximum quantity of sending times; and the sending a packet according to the packet sending information in step 23 includes: sending a packet according to the at least one piece of information.

Optionally, the method further includes:

receiving a packet response message returned by a packet receiving device; and sending a packet sending result to the controller, where the packet sending result includes at least one piece of information in the following:

a quantity of packet sending times, a quantity of times of successful packet sending, a quantity of times of packet response, and the packet response message.

Preferably, after the receiving a packet response message returned by a packet receiving device, the method further includes: stopping sending a packet according to the packet sending information.

Specifically, the flow entry installation message sent by the controller is received, the to-be-installed flow entry and the packet sending information are extracted from the flow entry installation message, and the to-be-installed flow entry is installed. The packet sending information includes the to-be-sent packet or the packet construction information used to construct the to-be-sent packet, and may further include packet sending action information, and the to-be-sent packet is sent according to a packet sending action. If the packet sending information includes the packet construction information, before being sent, the to-be-sent packet is constructed according to the packet construction information. When the packet is sent, if the packet response message returned by the packet receiving device is received, sending of the packet is stopped, and the packet sending result is returned to the controller, where the packet sending result may include a quantity of packet sending times, a quantity of times of successful packet sending, the packet response message, and the like. After the flow entry is installed, if a user packet is received, matching is performed between the user packet and a matching rule included in the flow entry, and if the matching is successful, the user packet is processed according to an action included in the flow entry.

In this embodiment, by receiving a flow entry installation message carrying a to-be-installed flow entry and a packet sending message, the to-be-installed flow entry and a to-be-sent packet are simultaneously received, the flow entry is installed, and a packet is sent according to the packet sending information, thereby reducing unnecessary control information exchange, and improving efficiency of flow entry installation and packet sending.

The following further describes the packet processing method in detail by using FIG. 3 to FIG. 6 as an example.

Figure 3:
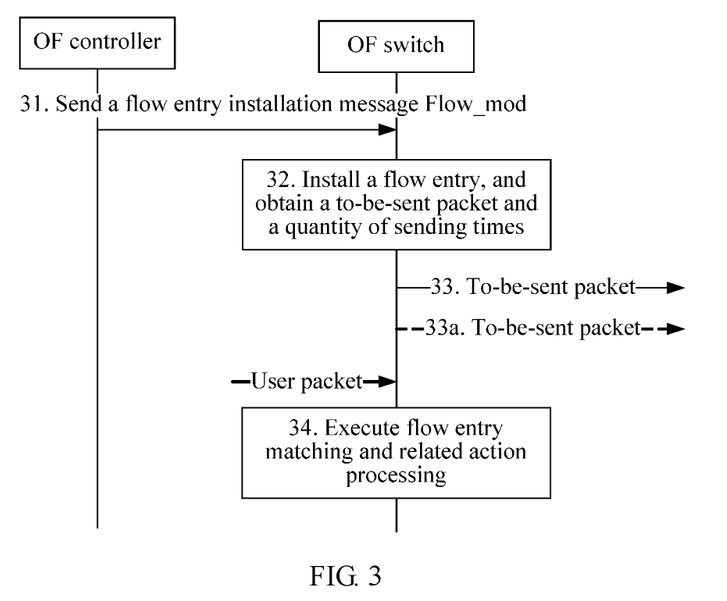
FIG. 3 is a signaling flowchart of a packet processing method according to another embodiment of the present invention.

FIG. 3 is a signaling flowchart of a packet processing method according to another embodiment of the present invention. The openflow protocol is used as an example in this embodiment. As shown in FIG. 3, the method specifically includes the following steps:

Step 31: An OF Controller generates a flow entry corresponding to a service flow, and delivers the flow entry and packet sending information to an OF Switch by using a flow entry installation message Flow_Mod, where the flow entry may include flow matching information and an action that needs to be executed for the flow.

A process of generating the flow entry and the packet sending information may be completed according to local configuration of the OF Controller, or may be completed by the OF Controller according to a received trigger message of another network element, which is not limited in this embodiment.

Further, the packet sending information may include a to-be-sent packet or packet construction information.

Further, the packet sending information may further include one or more pieces of information in the following: a required quantity of sending times, a packet processing action, a sending port, sending frequency (for example, three times/second), sending duration (for example, 30 seconds), a maximum quantity of sending times (for example, a maximum of 10 times), and maximum sending duration (for example, a maximum of 60 seconds).

In this embodiment, a to-be-sent packet (packet), a quantity of sending times, and a sending port number are used as an example, and if the OF Switch is instructed to send the to-be-sent packet twice and the sending port number is 2, a structure of the Flow_Mod message may be shown as follows:

<Flow_Mod>:={(flow match rule, actions),
(packet, output times=2, output port=2)}

Step 32: The OF Switch installs, into a flow table, the flow entry that is delivered by the OF Controller by using the Flow_Mod message, and the OF Switch acquires the packet sending information from the Flow_Mod message, where in this embodiment, the packet sending information includes a to-be-sent packet (packet), a quantity of packet sending times, and a sending port number.

Step 33: The OF Switch sends a packet (packet) out according to the packet sending information, where in this embodiment, the OF Switch successively sends the packet included in the Flow_Mod message from the port 2 twice.

Step 34: After a user packet arrives at the OF Switch, the OF Switch performs matching between the packet and the flow table, and executes a processing action corresponding to a flow entry on a packet that conforms to flow matching information of the flow entry.

In this embodiment, an OF Controller notifies, by using a flow entry installation message, an OF Switch of a flow table that needs to be installed and a packet that needs to be sent, and the OF Switch completes installing a flow entry and sending the packet out according to the flow entry installation message, thereby reducing unnecessary control message exchange, and improving efficiency of flow entry installation and packet sending.

Figure 4:
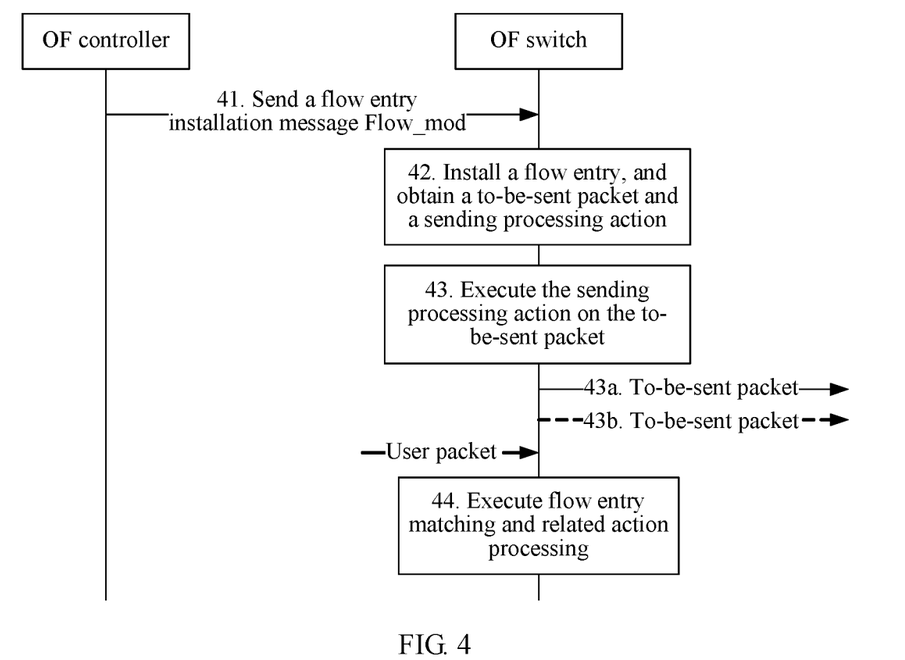
FIG. 4 is a signaling flowchart of a packet processing method according to another embodiment of the present invention.

FIG. 4 is a signaling flowchart of a packet processing method according to another embodiment of the present invention. The openflow protocol is used as an example in this embodiment. As shown in FIG. 4, the method specifically includes the following steps:

Step 41: An OF Controller generates a flow entry corresponding to a service flow, and delivers the flow entry and packet sending information to an OF Switch by using a Flow_Mod message, where the flow entry includes flow matching information and an action that needs to be executed for the flow.

In this embodiment, the packet sending information includes a to-be-sent packet (packet) and a sending processing action. The sending processing action may include an action, such as sending, modification of a packet (for example, a MAC header field or an IP header field), packet encapsulation, virtual port (for example, a GRE virtual port, an MPLS virtual port, or a GTP virtual port) forwarding, and the OF Switch may perform a specified modification on the packet according to the sending processing action, or forwards the packet to a specified virtual port to implement a corresponding function.

In this embodiment, a sending action is used as an example, and sending the packet twice is implemented by adding two sending actions (separately sending the packet to a port 1 and a port 2) to the Flow_Mod message. Correspondingly, a structure of the Flow_Mod message may be shown as follows:

<Flow_Mod>:={(flow match rule, actions),
(packet, actions(output to port 1, output to port 2))}

Step 42: The OF Switch installs, into a flow table, the flow entry that is delivered by the OF Controller by using the Flow_Mod message, and the OF Switch acquires the packet sending information from Flow_Mod, where in this embodiment, the packet sending information includes a to-be-sent packet and a sending processing action.

Step 43: The OF Switch sends a packet out according to the packet sending information, where in this embodiment, the OF Switch separately sends out the packet from the port 1 and the port 2 according to the two sending actions included in a packet execution message included in the Flow_Mod message.

Step 44: After a user packet arrives at the OF Switch, the OF Switch performs matching between the user packet and the flow table, and executes a processing action corresponding to a flow entry on a packet that conforms to flow matching information of the flow entry, where if the user packet conforms to the flow entry installed in step 42, the OF Switch sends out the user packet according to the actions in the flow entry.

In this embodiment, the openflow protocol is used as an example, an OF Controller sends a flow entry that needs to be installed, a to-be-sent packet, and a sending processing action to an OF Switch by using a flow entry installation message, and the OF Switch completes installing the flow entry and sending the packet out according to the flow entry installation message, thereby reducing unnecessary control message exchange, and improving efficiency of flow entry installation and packet sending.

Figure 5A:
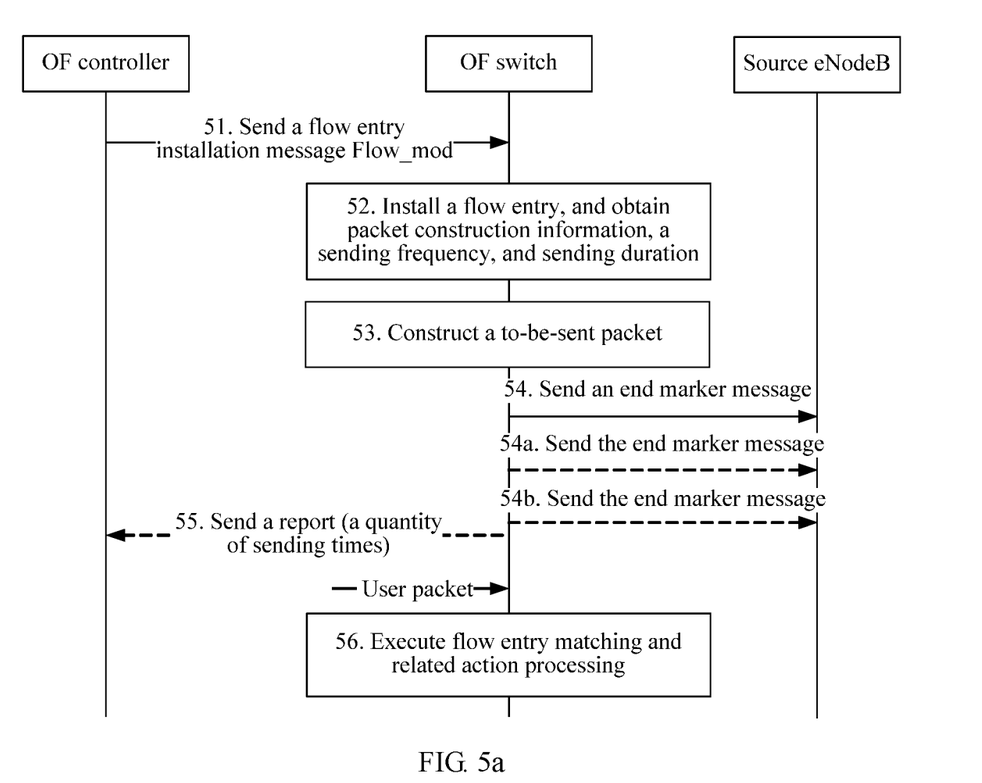
FIG. 5a is a signaling flowchart of a packet processing method according to another embodiment of the present invention.

FIG. 5a is a signaling flowchart of a packet processing method according to another embodiment of the present invention. An example in which an end marker (End Marker) message is sent by using the openflow protocol is used in this embodiment. As shown in FIG. 5a, the method specifically includes the following steps:

Step 51: An OF Controller generates a flow entry corresponding to a service flow, and delivers the flow entry and packet sending information to an OF Switch by using a Flow_Mod message, where the flow entry includes flow matching information to which the flow entry belongs and an action that needs to be executed for the flow.

In this embodiment, the packet sending information includes packet construction information, sending frequency, and sending duration. The packet construction information may optionally include: a source IP address, a destination IP address, a source port number, a destination port number, a message type, and the like. In this embodiment, the message type is an End marker message, the source IP address is a gateway IP address bound to the OF Switch, the destination IP address is an IP address of a source base station (Evolved Node B, eNodeB for short) in handover, and the source port number and the destination port number are a GTP protocol port number (2152).

Correspondingly, a structure of the Flow_Mod message may be shown as follows:

<Flow_Mod>:={(flow match rule, actions),
(packet construct info=[type:end marker;
source ip,target ip,source port, target port],
output frequence=1,
output times=3)}

Step 52: The OF Switch installs, into a flow table, the flow entry that is delivered by the OF Controller by using the Flow_Mod message, and the OF Switch acquires the packet sending information from the Flow_Mod message, where in this embodiment, the packet sending information includes packet construction information, sending frequency, and sending duration.

Step 53: The OF Switch constructs, according to the packet construction information, an end marker message that needs to be sent.

Step 54: The OF Switch sends the constructed end marker packet to a source eNodeB according to the sending frequency and the sending duration in the packet sending information, where in this embodiment, the OF Switch sends, at frequency of once per second, the end marker message to the source eNodeB three times according to the packet sending information in the Flow_Mod message sent in step 51.

Optionally, after the sending is completed, the method may further include: Step 55: The OF Switch returns a packet sending result to the OF Controller, where the message optionally includes a to-be-sent packet, a quantity of sending times, sending duration, and the like.

If the source eNodeB returns a response message or a failure indication message, the packet sending result may further include: a sending success indication, a quantity of times of successful sending, the response message, and the like.

Step 56: After a user packet arrives at the OF Switch, the OF Switch performs matching between the packet and the flow table, and executes a processing action corresponding to a flow entry on a packet that conforms to flow matching information of the flow entry.

Figure 5B:
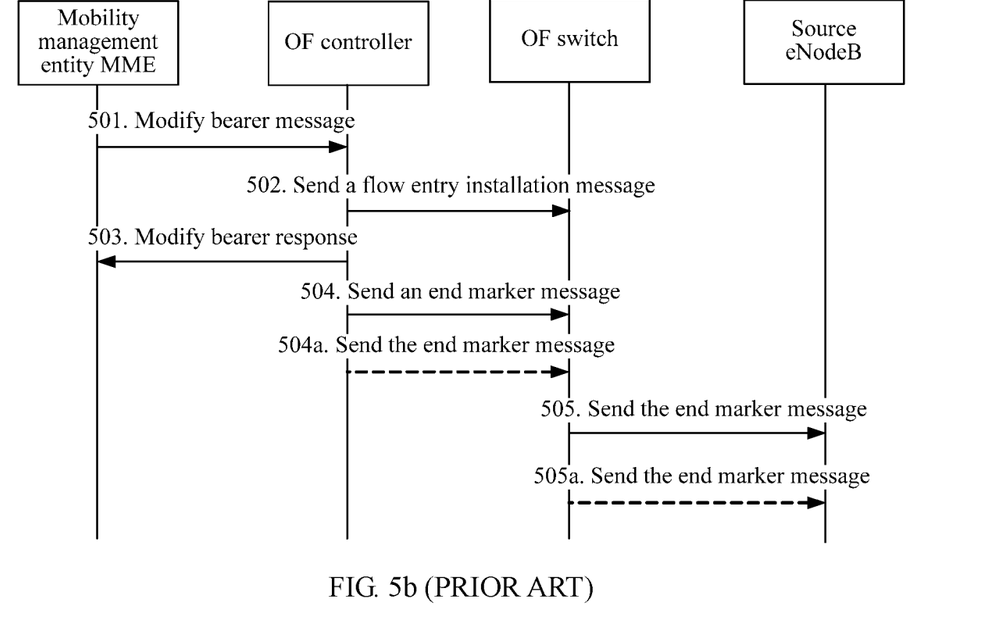
FIG. 5b is a flowchart of signaling exchange between an OF Controller and an OF Switch in the prior art.

In the prior art, in some scenarios, delivery of a flow entry and sending of a packet are generally performed together to implement a particular function. FIG. 5b is a flowchart of signaling exchange between an OF Controller and an OF Switch in the prior art. A method for handover in a 3GPP (3$^{rd}$ Generation Partnership Project) network based on the openflow protocol is used as an example in this flowchart. As shown in FIG. 5b, the method includes the following steps:

Step 501: When handover occurs, a mobility management entity (Mobility Management Entity, MME for short) sends a modify bearer request (Modify Bearer Request) message to an OF Controller to notify the Controller of modification to a bearer, where the modify bearer request message includes a flow matching template of a new bearer, for example, source and destination IP addresses, source and destination port numbers, and a TEID.

Step 502: The OF Controller generates flow matching information and a related action (for example, GTP encapsulation, forwarding, and QoS processing) according to flow information included in the modify bearer request message, and sends a flow entry including the flow matching information and the action to an OF Switch by using a Flow_Mod message.

Step 503: The OF Controller returns a modify bearer response (Modify Bearer Response) message to the MME.

Step 504: The OF Controller sends one or more end marker (End Marker) messages to the OF Switch by using a Packet_out message, and instructs, by using an action included in Packet_out, the OF Switch to send the one or more end marker messages to a source eNodeB in handover.

Step 505: The OF Switch sends the one or more end marker messages to the source eNodeB according to the packet_out message to indicate to the source eNodeB that bearer handover is completed, thereby completing handover of a terminal from the source eNodeB to a destination eNodeB.

In the prior art, because the OF Controller uses an independent flow entry installation message Flow_mod and packet sending message Packet_out, a process similar to the foregoing handover may cause exchange of multiple messages between the OF Controller and the OF Switch. If the foregoing process is frequently executed (for example, handover is simultaneously performed for a large quantity of users), a great deal of signaling load is caused to control interfaces, and control interfaces in an entire system are in an overloaded state.

In this embodiment, an example in which an End Marker message is sent by using the openflow protocol is used, an OF Controller notifies an OF Switch of a flow entry that needs to be installed, packet construction information, sending frequency, and sending duration by using a flow entry installation message, and the OF Switch completes installing the flow entry and sending a packet out according to the flow entry installation message, and returns a packet sending result to the OF Controller, thereby reducing unnecessary control message exchange, and improving efficiency of flow entry installation and packet sending.

The solution of the present invention is not limited to the openflow protocol, and may also be applied to various processes of installing a flow entry or a flow rule in a control and forwarding separated architecture.

Figure 6:
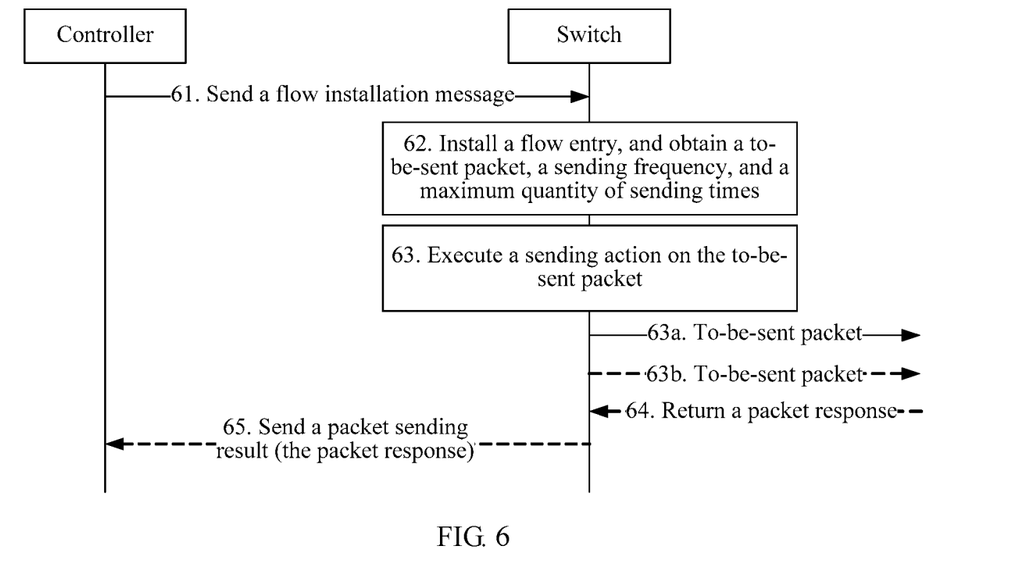
FIG. 6 is a signaling flowchart of a packet processing method according to another embodiment of the present invention.

FIG. 6 is a signaling flowchart of a packet processing method according to another embodiment of the present invention. A general-purpose controller and switch are used as an example in this embodiment. As shown in FIG. 6, the method specifically includes the following steps:

Step 61: A controller delivers a flow entry and packet sending information to a switch by using a flow installation (Flow_Install) message.

In this embodiment, the packet sending information includes a to-be-sent packet, sending frequency (for example, twice/second), and a maximum quantity of sending times (for example, a maximum of six times).

Optionally, the packet sending information may further include: a sending port, a sending processing action, sending duration, and the like, and processing of the packet sending information is similar to that in another embodiment described above. Details are not described in this embodiment again.

Step 62: The switch installs the flow entry delivered by the controller, and executes a processing action specified in the flow entry on a received packet according to the flow entry, and the switch acquires the packet sending information from Flow_Install, where in this embodiment, the packet sending information includes a to-be-sent packet, sending frequency, and a maximum quantity of sending times.

Step 63: The switch sends a packet out according to the packet sending information, where in this embodiment, the switch sends the packet to a peer device at frequency of twice per second, and the switch sends the packet a maximum of six times.

Optionally, in this embodiment, the method may further include: Step 64: The switch receives a response message that is returned by the communication peer device to the packet.

Optionally, in this embodiment, the method may further include: Step 65: The switch stops sending a packet, and returns a packet sending result to the controller, where the packet sending result may include the response message returned by the communication peer device. Optionally, the packet sending result may further include: a quantity of packet sending times, a quantity of times of successful sending, and the like in step 63.

A general-purpose controller and switch are used as an example in this embodiment, the controller notifies, by using a flow entry installation message Flow_Install, the switch of a flow entry that needs to be installed, a packet that needs to be sent, and a maximum quantity of sending times, and the switch completes installing the flow entry and sending the packet out according to the flow entry installation message. Optionally, when the switch receives a response packet corresponding to the sent packet, the switch stops sending a packet, and reports the response packet to the controller, thereby reducing unnecessary control message exchange, and improving efficiency of flow entry installation and packet sending.

According to the method provided in the foregoing embodiments, a controller can execute installation of a flow entry while instructing a switch to complete a packet sending action, thereby reducing load of control and forwarding interfaces, reducing resource occupation by the controller and the switch, and improving stability of system operation.

Figure 7:
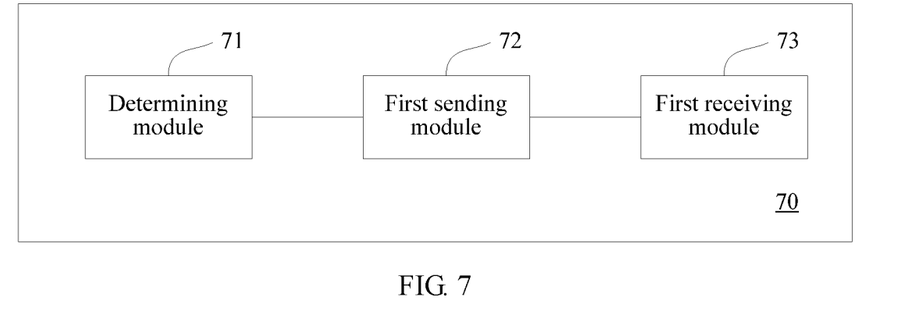
FIG. 7 is a schematic structural diagram of a controller according to an embodiment of the present invention.

FIG. 7 is a schematic structural diagram of a controller according to an embodiment of the present invention. As shown in FIG. 7, the controller 70 includes: a determining module 71 and a first sending module 72, and optionally includes a first receiving module 73.

The determining module 71 is configured to determine a to-be-installed flow entry and packet sending information.

The first sending module 72 is configured to send, to a switch, a flow entry installation message carrying the to-be-installed flow entry and the packet sending information, so that the switch obtains the to-be-installed flow entry and the packet sending information from the flow entry installation message, installs the flow entry, and sends a packet according to the packet sending information.

The first receiving module 73 is configured to: after the first sending module 72 sends, to the switch, the flow entry installation message carrying the to-be-installed flow entry and the packet sending information, receive a packet sending result returned by the switch, where the packet sending result includes at least one piece of information in the following:

a quantity of packet sending times, a quantity of times of successful packet sending, a packet response message, and a quantity of times of packet response.

Further, the determining module 71 is specifically configured to:

determine the to-be-installed flow entry and the packet sending information according to local configuration; or determine the to-be-installed flow entry and the packet sending information by receiving a trigger message of a network element.

Further, the packet sending information includes a to-be-sent packet or packet construction information used to construct a to-be-sent packet.

The packet construction information includes at least one piece of information in the following:

a source MAC address, a destination MAC address, a source IP address, a destination IP address, a source port number, a destination port number, a packet sequence number, a message type, a GTP TEID, and a GRE Key.

Further, the packet sending information further includes at least one piece of information in the following:

a quantity of packet sending times, a sending processing action, a sending port, sending frequency, sending duration, maximum sending duration, and a maximum quantity of sending times.

The controller provided in this embodiment may be configured to perform steps of the packet processing method shown in FIG. 1, where the implementation principles and technical effects thereof are similar, and details are not described herein again.

Figure 8:
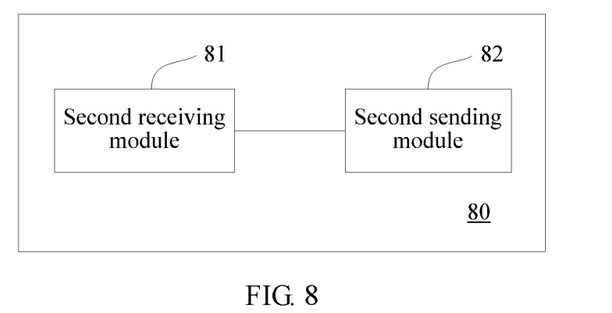
FIG. 8 is a schematic structural diagram of a switch according to an embodiment of the present invention.

FIG. 8 is a schematic structural diagram of a switch according to an embodiment of the present invention. As shown in FIG. 8, the switch 80 includes a second receiving module 81 and a second sending module 82, where the second receiving module 81 is configured to receive a flow entry installation message that is sent by a controller and that carries a to-be-installed flow entry and packet sending information; and the second sending module 82 is configured to: obtain the to-be-installed flow entry and the packet sending information from the flow entry installation message; and install the flow entry, and send a packet according to the packet sending information.

Further, the packet sending information includes a to-be-sent packet; and correspondingly, the second sending module 82 is specifically configured to:

acquire the to-be-sent packet from the packet sending information, and send the packet.

Alternatively, the packet sending information includes packet construction information used to construct a to-be-sent packet; and correspondingly, the second sending module 82 is specifically configured to:

acquire the packet construction information from the packet sending information; and construct the to-be-sent packet according to the packet construction information, and send the packet.

The packet construction information includes at least one piece of information in the following:

a source MAC address, a destination MAC address, a source IP address, a destination IP address, a source port number, a destination port number, a packet sequence number, a message type, a GTP TEID, and a GRE Key.

Further, the packet sending information further includes at least one piece of information in the following:

a quantity of packet sending times, a sending processing action, a sending port, sending frequency, sending duration, maximum sending duration, and a maximum quantity of sending times; and the second sending module 82 is specifically configured to:

send a packet according to the at least one piece of information.

Optionally, the second sending module 82 is further configured to:

receive a packet response message returned by a packet receiving device; and send a packet sending result to the controller, where the packet sending result includes at least one piece of information in the following:

a quantity of packet sending times, a quantity of times of successful packet sending, a quantity of times of packet response, and the packet response message.

Preferably, the second sending module 82 is further configured to: after receiving the packet response message returned by the packet receiving device, stop sending a packet according to the packet sending information.

The switch provided in this embodiment may be configured to perform steps of the packet processing method shown in FIG. 2, where the implementation principles and technical effects thereof are similar, and details are not described herein again.

Figure 9:
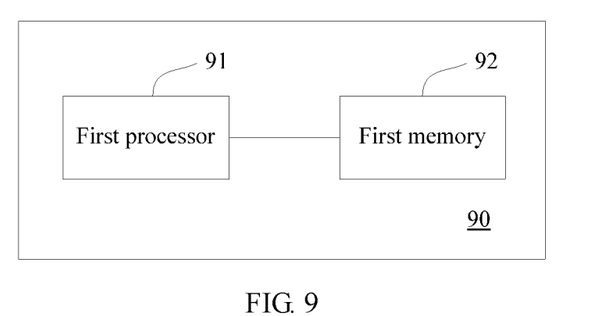
FIG. 9 is a schematic structural diagram of a controller according to another embodiment of the present invention.

FIG. 9 is a schematic structural diagram of a controller according to another embodiment of the present invention. As shown in FIG. 9, the controller 90 includes a first processor 91 and a first memory 92, where the first memory stores a set of program code, and the first processor is configured to invoke the program code stored in the first memory, and may perform steps in the packet processing method shown in FIG. 1, where the implementation principles and technical effects thereof are similar, and details are not described herein again.

Figure 10:
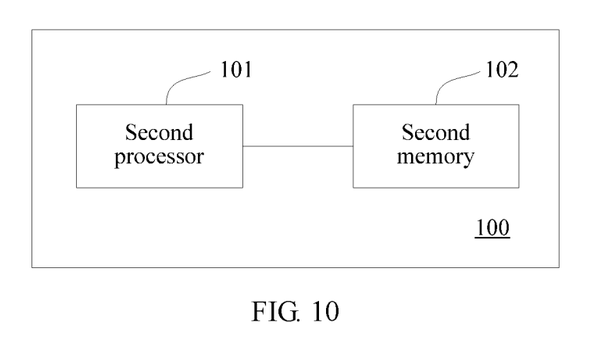
FIG. 10 is a schematic structural diagram of a switch according to another embodiment of the present invention.

FIG. 10 is a schematic structural diagram of a switch according to another embodiment of the present invention. As shown in FIG. 10, the switch 100 includes a second processor 101 and a second memory 102, where the second memory stores a set of program code, and the second processor is configured to invoke the program code stored in the second memory, and may perform steps in the packet processing method shown in FIG. 2, where the implementation principles and technical effects thereof are similar, and details are not described herein again.

Figure 11:
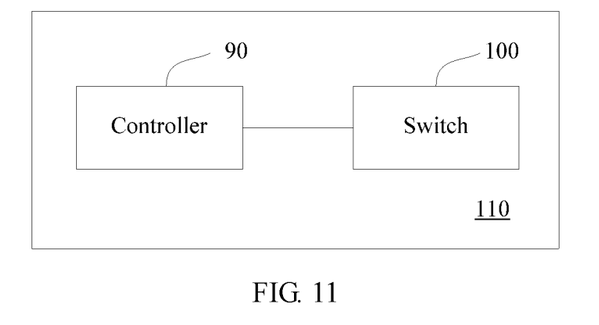
FIG. 11 is a schematic structural diagram of a network device according to an embodiment of the present invention.

FIG. 11 is a schematic structural diagram of a network device according to an embodiment of the present invention. As shown in FIG. 11, the network device 110 includes the controller 90 shown in FIG. 9 and the switch 100 shown in FIG. 10, where the controller 90 and the switch 100 may be respectively configured to perform steps of the packet processing method shown in FIG. 1 and steps of the packet processing method shown in FIG. 2, where the implementation principles and technical effects thereof are similar, and details are not described herein again.

An embodiment of the present invention further provides a computer program product, where the computer program product includes a computer readable medium, where the readable medium includes a set of program code, used to perform steps of the packet processing method shown in FIG. 1, and used to perform steps of the packet processing method shown in FIG. 2.

With descriptions of the foregoing embodiments, persons skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method for packet processing, comprising:
  receiving, by a control plane apparatus of a core network, from a mobility management network element, a request for switching a flow from a source base station to a target base station in a handover procedure;
  determining, by the control plane apparatus in accordance with the receiving, packet sending information excluding an end marker message, wherein the packet sending information instructs a forwarding plane apparatus of the core network to perform the operations of:
    constructing the end marker message, and
    sending the end marker message to the source base station; and
  sending, by the control plane apparatus, to the forwarding plane apparatus, the packet sending information.

2. The method according to claim 1, wherein the packet sending information comprises at least one of: a destination IP address, a GTP (GPRS Tunneling Protocol) TEID (Tunnel Endpoint IDentifier), a source port number, or a destination port number.

3. The method according to claim 1, further comprising:
  determining, by the control plane apparatus, a matching information, wherein the matching information is used to match a user packet; and
  sending, by the control plane apparatus, the matching information with the packet sending information to the forwarding plane apparatus.

4. The method according to claim 3, further comprising:
  determining, by the control plane apparatus, an action, wherein the action is to be executed on a user data packet mapping the matching information; and
  sending, by the control plane apparatus, an information indicating the action with the packet sending information and the matching information to the forwarding plane apparatus.

5. The method according to claim 1, further comprising:
  in accordance with receiving the packet sending information:
    constructing, by the forwarding plane apparatus, the end marker message; and
    sending, by the forwarding plane apparatus, the end marker message to the source base station.

6. The method according to claim 5, wherein
  the determining, by the control plane apparatus, the packet sending information comprises: determining, by the control plane apparatus, the packet sending information and matching information, wherein the matching information is used to match a user packet; and
  the sending, by the control plane apparatus, to the forwarding plane apparatus, the packet sending information comprises: sending, by the control plane apparatus, to the forwarding plane apparatus, the packet sending information and the matching information.

7. The method according to claim 6, wherein
  the determining, by the control plane apparatus, the packet sending information and matching information comprises: determining, by the control plane apparatus, the packet sending information, the matching information, and an action, wherein the action is to be executed on a user data packet mapping the matching information;
  the sending, by the control plane apparatus, to the forwarding plane apparatus, the packet sending information and the matching information comprises: sending, by the control plane apparatus, to the forwarding plane apparatus, the packet sending information, the matching information, and information indicating the action.

8. A control plane apparatus of a core network, comprising:
  a computer readable memory having instructions stored thereon; and
  a processor in communication with the memory, wherein the processor executes the instructions to perform the operations of:
    receiving, from a mobility management network element, a request for switching a flow from a source base station to a target base station in a handover procedure;
    determining, in response to the receiving, packet sending information excluding an end marker message, wherein the packet sending information instructs a forwarding plane apparatus of the core network to perform the operations of:
      constructing the end marker message, and
      sending the end marker message to the source base station; and
    sending, to the forwarding plane apparatus, the packet sending information.

9. The control plane apparatus according to claim 8, wherein the packet sending information comprises at least one of: a destination IP address, a GTP (GPRS Tunneling Protocol) TEID (Tunnel Endpoint IDentifier), a source port number, or a destination port number.

10. The control plane apparatus according to claim 8, wherein the processor executes the instructions to perform the operations of:
   determining a matching information, wherein the matching information is used to match a user packet; and
   sending, to the forwarding plane apparatus, the packet sending information and the matching information.

11. The control plane apparatus according to claim 10, wherein the processor executes the instructions to perform the operations of:
   determining an action, wherein the action is to be executed on a user data packet mapping the matching information; and
   sending, to the forwarding plane apparatus, the packet sending information, the matching information, and information indicating the action.

12. A communication system comprising:
   a control plane apparatus of a core network; and
   a forwarding plane apparatus of the core network;
   wherein the control plane apparatus is configured to perform a method comprising:
      receiving, from a mobility management network element, a request for switching a flow from a source base station to a target base station in a handover procedure, and
      sending, in accordance with the receiving, packet sending information excluding an end marker message to the forwarding plane apparatus, wherein the packet sending information instructs the forwarding plane apparatus to perform the operations of:
         constructing the end marker message, and
         sending the end marker message to the source base station; and
   wherein the forwarding plane apparatus is configured to perform a method comprising:
      constructing, in accordance with the packet sending information, the end marker message, and
      sending the end marker message to the source base station.

13. The system according to claim 12, wherein the packet sending information comprises at least one of: a destination IP address, a GTP (GPRS Tunneling Protocol) TEID (Tunnel Endpoint IDentifier), a source port number, or a destination port number.

14. The system according to claim 12, wherein:
   the control plane apparatus is configured to send the packet sending information and matching information to the forwarding plane apparatus; and
   the forwarding plane apparatus is configured to perform matching on a user packet according to the matching information.

15. The system according to claim 14, wherein:
   the control plane apparatus is configured to send the packet sending information, the matching information, and information indicating an action to the forwarding plane apparatus; and
   the forwarding plane apparatus is configured to execute the action on a user packet matching the matching information.

16. The system according to claim 12, further comprising:
   the source base station, configured to carry out a method comprising receiving the end marker message from the forwarding plane apparatus in the handover procedure.

* * * * *

UNITED STATES PATENT AND TRADEMARK OFFICE
CERTIFICATE OF CORRECTION

PATENT NO. : 11,134,009 B2
APPLICATION NO. : 16/211718
DATED : September 28, 2021
INVENTOR(S) : Hu et al.

Page 1 of 1

It is certified that error appears in the above-identified patent and that said Letters Patent is hereby corrected as shown below:

On the Title Page

Item (71), Applicant "HUAWEI TECHNOLOGIES CO.,LTD., Guangdong (CN)" should read
-- HUAWEI TECHNOLOGIES CO.,LTD., Shenzhen (CN) --.

Signed and Sealed this
Twenty-sixth Day of July, 2022

Katherine Kelly Vidal
*Director of the United States Patent and Trademark Office*